US012124547B2

(12) United States Patent
Takada

(10) Patent No.: US 12,124,547 B2
(45) Date of Patent: *Oct. 22, 2024

(54) AUTHENTICATION DEVICE AND AUTHENTICATION METHOD

(71) Applicant: TOYOTA JIDOSHA KABUSHIKI KAISHA, Toyota (JP)

(72) Inventor: Naoyuki Takada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 345 days.

This patent is subject to a terminal disclaimer.

(21) Appl. No.: 17/581,132

(22) Filed: Jan. 21, 2022

(65) Prior Publication Data

US 2022/0147606 A1 May 12, 2022

Related U.S. Application Data

(63) Continuation of application No. 16/001,261, filed on Jun. 6, 2018, now Pat. No. 11,269,980.

(30) Foreign Application Priority Data

Jul. 13, 2017 (JP) ................................ 2017-137305

(51) Int. Cl.
G06F 21/32 (2013.01)
G06V 40/50 (2022.01)
G06V 40/70 (2022.01)

(52) U.S. Cl.
CPC .............. *G06F 21/32* (2013.01); *G06V 40/50* (2022.01); *G06V 40/70* (2022.01); *G06F 2221/2135* (2013.01)

(58) Field of Classification Search
None
See application file for complete search history.

(56) References Cited

U.S. PATENT DOCUMENTS 10,053,056 B1 8/2018 Zhang et al.
2003/0046540 A1 3/2003 Nakamura et al.
(Continued)

FOREIGN PATENT DOCUMENTS

CN 1773525 A 5/2006
CN 102857693 A 1/2013
(Continued)

OTHER PUBLICATIONS

May 20, 2020 Office Action issued in U.S. Appl. No. 16/001,261.
(Continued)

*Primary Examiner* — Atta Khan
(74) *Attorney, Agent, or Firm* — Oliff PLC

(57) ABSTRACT

An authentication device authenticates a user using biometric information. The authentication device including: a storage unit, a first acquisition unit, a second acquisition unit, a controller, an authentication processing unit, and an update processing unit. When the first acquisition unit acquires identification information, and a combination for which the number of successes for the acquired identification information is greater than or equal to a predetermined number is present in combination information, the controller sets a
(Continued)

threshold such that a false acceptance rate for erroneously authenticating a person other than a registered user becomes lower than when the combination is not present.

11 Claims, 2 Drawing Sheets

(56) References Cited

U.S. PATENT DOCUMENTS

| | | |
|---|---|---|
| 2006/0098847 A1 | 5/2006 | Takahashi |
| 2006/0156028 A1 | 7/2006 | Aoyama et al. |
| 2012/0286931 A1* | 11/2012 | Semba .................... G06F 21/32 340/5.83 |
| 2013/0004029 A1 | 1/2013 | Yamada |
| 2013/0263282 A1 | 10/2013 | Yamada et al. |
| 2014/0130148 A1 | 5/2014 | Sako et al. |
| 2014/0157381 A1 | 6/2014 | Disraeli |
| 2014/0282931 A1* | 9/2014 | Protopapas ......... B60R 25/2081 726/5 |
| 2016/0147987 A1 | 5/2016 | Jang et al. |
| 2016/0292536 A1 | 10/2016 | Irie et al. |
| 2017/0262719 A1 | 9/2017 | Yamazaki et al. |

FOREIGN PATENT DOCUMENTS

| | | |
|---|---|---|
| CN | 104057919 A | 9/2014 |
| JP | 2003-178032 A | 6/2003 |
| JP | 2006-082691 A | 3/2006 |
| JP | 2006-139464 A | 6/2006 |
| JP | 2010-049694 A | 3/2010 |
| JP | 2012-123526 A | 6/2012 |
| JP | 2013-012130 A | 1/2013 |
| JP | 2013-205932 A | 10/2013 |
| JP | 2014-081796 A | 5/2014 |

OTHER PUBLICATIONS

Nov. 9, 2020 Office Action issued in U.S. Appl. No. 16/001,261.
Mar. 30, 2021 Office Action issued in U.S. Appl. No. 16/001,261.
Nov. 17, 2021 Notice of Allowance issued in U.S. Appl. No. 16/001,261.

* cited by examiner

| IDENTIFICATION INFORMATION | BIOMETRIC INFORMATION | COMBINATION | NUMBER OF SUCCESSES |
|---|---|---|---|
| K1 | A | [K1, A] | 17 |
| K1 | C | [K1, C] | 0 |
| K1 | D | [K1, D] | 0 |
| K2 | B | [K2, B] | 8 |
| K3 | C | [K3, C] | 5 |
| K3 | B | [K3, B] | 0 |
| ⋮ | | | |

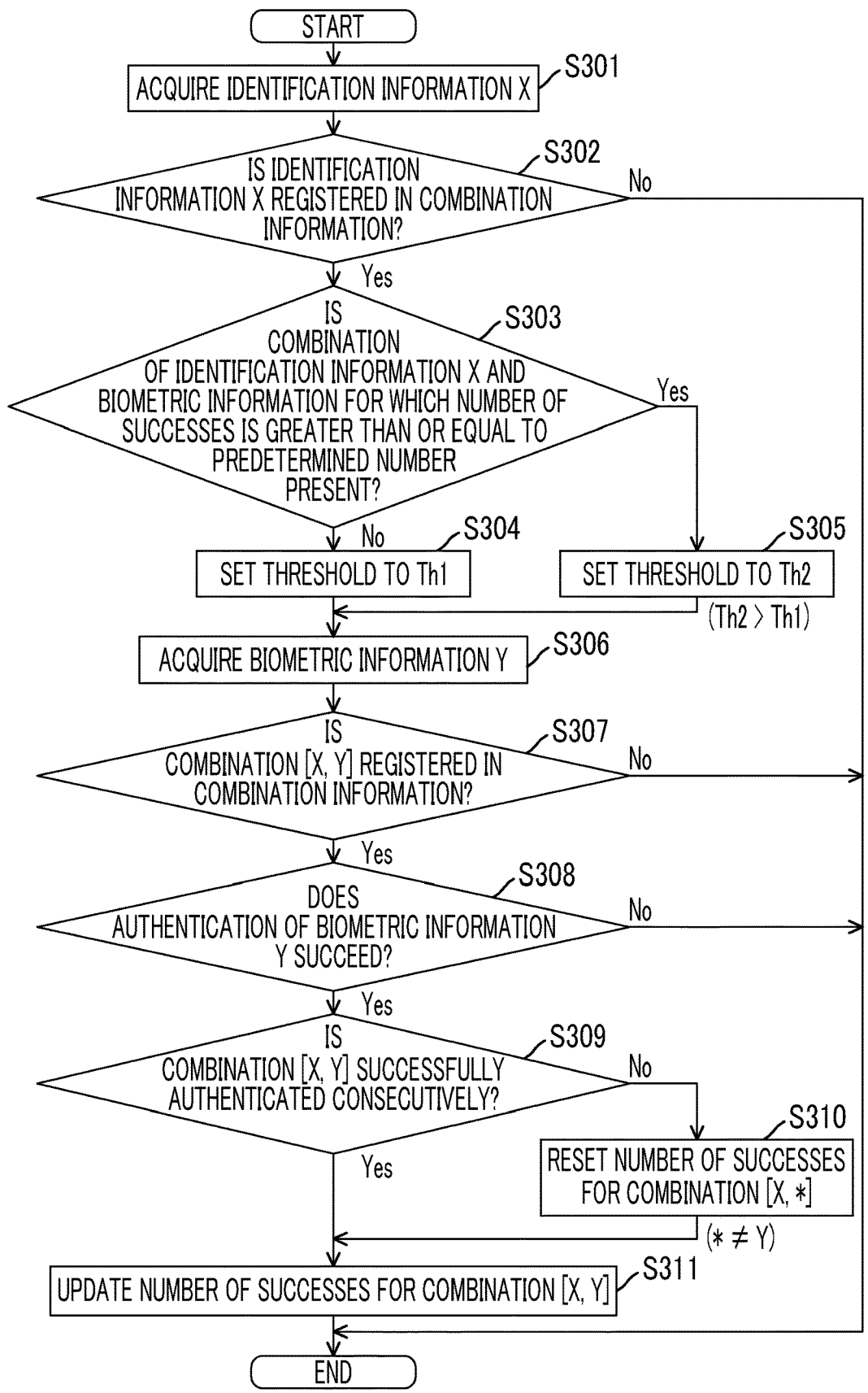

AUTHENTICATION DEVICE AND AUTHENTICATION METHOD

INCORPORATION BY REFERENCE

This is a Continuation of application Ser. No. 16/001,261 filed Jun. 6, 2018, which claims priority to Japanese Patent Application No. 2017-137305 filed Jul. 13, 2017. The disclosure of the prior applications including the specification, drawings and abstract is incorporated herein by reference in its entirety.

BACKGROUND

1. Technical Field

The present disclosure relates to an authentication device and an authentication method for authenticating a user using biometric information.

2. Description of Related Art

An authentication device disclosed in, for example, Japanese Unexamined Patent Application Publication No. 2013-205932 (JP 2013-205932 A) and Japanese Unexamined Patent Application Publication No. 2010-049694 (JP 2010-049694 A) determines whether or not a person is valid using biometric information that includes biological characteristics of a person. The biometric information includes physiological characteristics based on physiological appearance such as a face, a fingerprint, an iris, and a vein, and behavioral characteristics based on behavioral features such as a voice and a signature.

In the authentication device, the biometric information is read from a user who is an authentication target, and the read biometric information is compared with biometric information preregistered in a memory and the like. The authentication device authenticates the user who is an authentication target by determining whether or not the similarity between both biometric information acquired by comparison exceeds a threshold that is a reference for authenticating the user as a valid person.

SUMMARY

In the authentication device in the related art, the threshold for determination of success or failure in the authentication of the user who is an authentication target is fixedly set. Thus, the false acceptance rate for erroneously authenticating a person other than the preregistered user cannot be decreased below the set value.

The present disclosure provides an authentication device and an authentication method that can decrease the false acceptance rate for erroneously authenticating a person other than a preregistered user.

A first aspect of the present disclosure relates to an authentication device that authenticates a user using biometric information. The authentication device includes a storage unit configured to store combination information in advance, the combination information including a combination of biometric information on a registered user and identification information on a terminal carried by the registered user, and the number of successes in biometric authentication, for each item of the identification information, regarding the biometric information combined with the identification information; a first acquisition unit configured to acquire identification information that is transmitted from a terminal present around the authentication device; a second acquisition unit configured to acquire biometric information from an authentication target user; a controller configured to control a threshold for determination of success or failure in authentication of the authentication target user based on the identification information acquired by the first acquisition unit and the combination information stored in the storage unit; an authentication processing unit configured to, when a combination of the identification information acquired by the first acquisition unit and the biometric information acquired by the second acquisition unit is present in the combination information, authenticate the authentication target user based on the threshold and a result of comparison between the biometric information acquired by the second acquisition unit and the biometric information on the registered user; and an update processing unit configured to, when the authentication succeeds in the authentication processing unit, update the number of successes for the combination of biometric information and identification information in the successful authentication by increasing the number of successes by one. The controller is configured to, when the first acquisition unit acquires the identification information, and a combination for which the number of successes for the acquired identification information is greater than or equal to a predetermined number is present in the combination information, set the threshold such that a false acceptance rate for erroneously authenticating a person other than the registered user becomes lower than when the combination is not present.

In the authentication device according to the first aspect of the present disclosure, the combination information in which the biometric information on the preregistered user is combined with the identification information on the terminal carried by the user is stored in advance in the storage unit. For each item of the identification information, the number of successes in biometric authentication regarding the biometric information combined with the identification information is recorded in the combination information. For example, when biometric authentication succeeds, the number of successes is updated by adding one to the number of successes for the combination of the biometric information on the successfully authenticated user and the identification information on the terminal carried by the user at the time of success in authentication. Accordingly, as the number of successes in biometric authentication is increased in the authentication device, the number of successes for the combination of the user (biometric information) and the terminal (identification information) carried by the user at the time of success in biometric authentication is increased.

In the authentication device according to the first aspect of the present disclosure, when the authentication target user is authenticated by acquiring the biometric information using the second acquisition unit, the threshold for determination of success or failure in authentication is controlled based on the identification information on the terminal acquired by the first acquisition unit. Specifically, when the combination for which the number of successes for the identification information acquired by the first acquisition unit is greater than or equal to the predetermined number is present among combinations stored in the storage unit, the threshold for determination of success or failure in authentication is changed to a higher value such that the false acceptance rate for erroneously authenticating a person other than the registered user becomes lower than when the combination is not present.

By such a control, the threshold for determination of success or failure in authentication can be increased when the user carrying a specific terminal can be inferred with high reliability according to whether or not the number of successes exceeds the predetermined number in a state where the specific terminal is recognized by acquiring the identification information using the first acquisition unit. As described above, for example, the false acceptance rate for erroneously authenticating a person other than the registered user can be decreased in a situation where the probability of authenticating the user as a valid person is sufficiently high. Accordingly, for example, the anti-theft performance of a device or a vehicle in which the authentication device is installed can be improved.

In the authentication device according to the first aspect of the present disclosure, the number of successes may be the number of consecutive successes in authentication of the biometric information combined with the identification information in the authentication processing unit. In the authentication device according to the first aspect of the present disclosure, the update processing unit may be configured to reset the number of successes for other combinations other than the combination in the current successful authentication with respect to the same identification information when the biometric information that is acquired by the second acquisition unit combined with the identification information acquired by the first acquisition unit in a current authentication process is different from the biometric information that has been combined with the same identification information up to the present. In the authentication device according to the first aspect of the present disclosure, the number of successes may be the number of successes in authentication of the biometric information combined with the identification information in a predetermined period in the authentication processing unit. By using such a number of successes, the reliability of inferring the user is further increased, and the anti-theft performance of the device or the vehicle in which the authentication device is installed can be further improved.

In the authentication device according to the first aspect of the present disclosure, the controller may be configured to, when the combination for which the number of successes for the acquired identification information is greater than or equal to the predetermined number is present, set the threshold to be used when the combination is not present in the storage unit to a first threshold lower than a second threshold that is used when the combination for which the number of successes is greater than or equal to the predetermined number is present.

In the authentication device according to the first aspect of the present disclosure, all or a part of the storage unit, the first acquisition unit, the second acquisition unit, the controller, the authentication processing unit, and the update processing unit may be configured with an electronic control unit.

A second aspect of the present disclosure relates to an authentication method executed by an authentication device that authenticates a user using biometric information. The authentication device includes an electronic control unit that includes a storage unit which stores combination information in advance. The combination information includes a combination of biometric information on a registered user and identification information on a terminal carried by the registered user, and the number of successes in biometric authentication, for each item of the identification information, regarding the biometric information combined with the identification information. The authentication method includes, by the electronic control unit, acquiring identification information that is transmitted from a terminal present around the authentication device; acquiring biometric information from an authentication target user; controlling a threshold for determination of success or failure in authentication of the authentication target user based on the acquired identification information and the combination information stored in the storage unit; authenticating the authentication target user based on the threshold and a result of comparison between the acquired biometric information and the biometric information on the registered user when a combination of the acquired identification information and the acquired biometric information is present in the combination information; when the authentication succeeds, updating the number of successes for the combination of the biometric information and the identification information in the successful authentication by increasing the number of successes by one; and when the identification information is acquired, and a combination for which the number of successes for the acquired identification information is greater than or equal to a predetermined number is present in the combination information, setting the threshold such that a false acceptance rate for erroneously authenticating a person other than the registered user becomes lower than when the combination is not present.

As described thus far, the authentication device and the authentication method according to the aspects of the present disclosure can decrease the false acceptance rate for erroneously authenticating a person other than the preregistered user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a flowchart for describing an authentication process executed by the authentication device according to the present embodiment.

DETAILED DESCRIPTION OF EMBODIMENTS

Overview

Figures 1, 2:
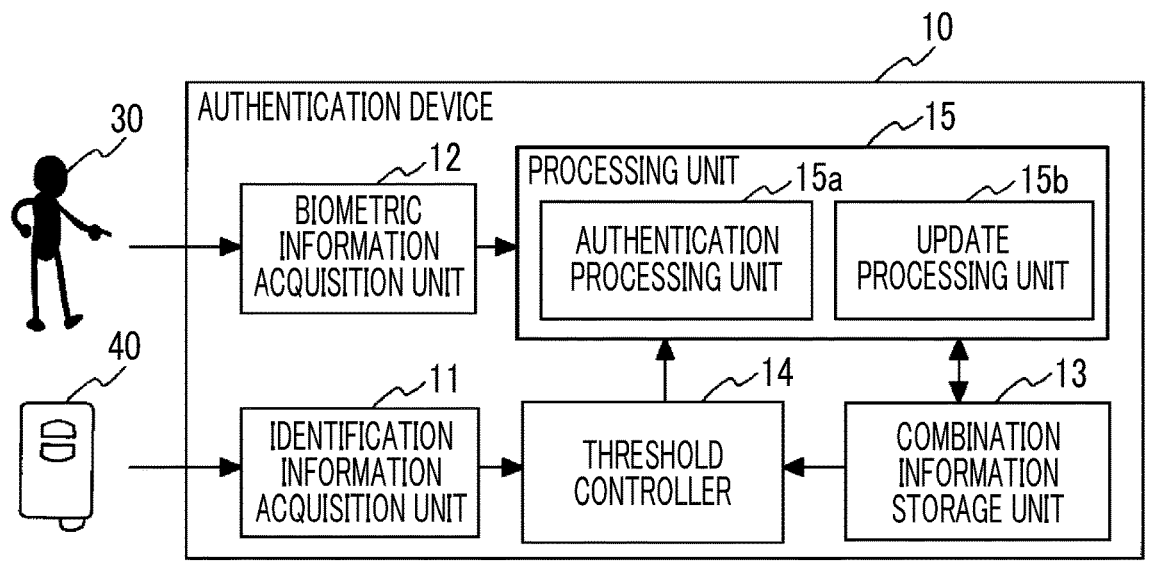
FIG. 1 is a diagram for describing a schematic configuration of an authentication device according to one embodiment of the present disclosure.
FIG. 2 is a table illustrating one example of combination information stored in a combination information storage unit.

An authentication device according to an embodiment of the present disclosure preregisters a combination of a user and a terminal carried by the user, and records the number of successes in biometric authentication performed up to the present with respect to the combination. The authentication device increases a threshold for determination of success or failure in biometric authentication when the number of successes in biometric authentication for a certain combination exceeds a predetermined number. Accordingly, for example, the false acceptance rate for erroneously authenticating a person can be decreased in a situation where the probability of authenticating the user as a valid person is sufficiently high.

Configuration of Authentication Device

FIG. 1 is a diagram for describing a schematic configuration of an authentication device 10 according to one embodiment of the present disclosure. The authentication device 10 according to the present embodiment illustrated in FIG. 1 includes an identification information acquisition unit 11, a biometric information acquisition unit 12, a combination information storage unit 13, a threshold controller 14, and a processing unit 15. The processing unit 15 includes an authentication processing unit 15a and an update processing unit 15b.

FIG. 1 illustrates a situation where a user (hereinafter, referred to as an "authentication target user") 30 who requests the authentication device 10 to perform an authentication process is present around the authentication device 10 while carrying a terminal 40. Examples of the terminal 40 include a smartphone, a mobile phone, a tablet, and a portable device such as an electronic key and a card key.

In the present embodiment illustrated below, the present disclosure will be illustratively described in a case where the authentication device 10 is installed in a vehicle such as a passenger car, and the authentication target user 30 requests the authentication device 10 to perform the authentication process for using the vehicle. The authentication device 10 according to the present embodiment can be installed in various places where the authentication process for a valid person is needed for providing a service such as permitting entry or exit from a predetermined area such as a building and a room, and permitting withdrawal or deposit of money at an automatic teller machine (ATM) and the like.

The identification information acquisition unit 11 (can be regarded as a "first acquisition unit" in the aspects of the present disclosure) can acquire identification information that is transmitted from the terminal 40 present around the authentication device 10. The identification information may be unique information that can distinguish one terminal from another terminal. The format or form of the information is not particularly limited. The identification information acquisition unit 11 may acquire the identification information from the terminal 40 either by wireless communication or by wired communication. The identification information acquisition unit 11 may request the terminal 40 to transmit the identification information or may wait until the identification information is transmitted from the terminal 40.

In the present embodiment, the terminal 40 corresponds to an electronic key or a card key assigned to the vehicle, and the identification information corresponds to a key identifier (ID). In such a case, for example, a request signal for requesting provision of the key identifier is transmitted from the vehicle side toward the terminal 40 that is an electronic key. The terminal 40 receives the request signal from the vehicle and provides (transmits) the key identifier retained in the terminal 40 to the authentication device 10. The identification information acquired by the identification information acquisition unit 11 is output to the threshold controller 14 after the terminal 40 is authenticated as a valid terminal (electronic key) by a predetermined comparison process.

The biometric information acquisition unit 12 (can be regarded as a "second acquisition unit" in the aspects of the present disclosure) can acquire biometric information on a person. More specifically, the biometric information acquisition unit 12 acquires biometric information that is input by the authentication target user 30 who uses the vehicle. The biometric information can be read by one or a plurality of predetermined reading devices (not illustrated) installed inside and outside the vehicle cabin. Examples of the biometric information include a face, a fingerprint or a vein on a finger, an iris of an eyeball, a retina, a voiceprint, and deoxyribonucleic acid (DNA) of a person.

In the embodiment where the authentication device 10 is applied to the vehicle, for example, a camera sensor that is installed near a dashboard or an instrument panel of the vehicle and can acquire an image of the face of an occupant in the seat can be used as the reading device. For example, a fingerprint sensor that is installed near a door handle of the vehicle and can detect a fingerprint can be used as the reading device. Besides, a well-known device can be used as the reading device. The biometric information acquired by the biometric information acquisition unit 12 is output to the authentication processing unit 15a of the processing unit 15.

The combination information storage unit 13 (can be regarded as a "storage unit" in the aspects of the present disclosure) is configured with, for example, a memory and stores combination information in advance. The combination information indicates a combination of a user and a predetermined terminal. More specifically, the combination information is information in which the biometric information on a user (hereinafter, referred to as a "registered user") who is preregistered for using the authentication device 10 (vehicle) is associated with the identification information on the terminal carried by the registered user. The combination information includes the number of successes (for example, a count value acquired by a counter) that indicates, for each item of the identification, the number of successes in biometric authentication regarding the biometric information combined with the identification information in the authentication processing unit 15a described below.

FIG. 2 illustrates one example of the combination information stored in the combination information storage unit 13. In the example in FIG. 2, one or a plurality of pieces of biometric information is combined with one identification information, and the number of successes in biometric authentication is recorded for each combination. For example, a combination [K1, A] of identification information "K1" and biometric information "A" shows 17 successes in biometric authentication. A combination [K1, C] of the identification information "K1" and biometric information "C" shows zero successes in biometric authentication.

The combination information may be preregistered in the combination information storage unit 13 through the identification information acquisition unit 11 and the biometric information acquisition unit 12, or may be preregistered in the combination information storage unit 13 from a configuration (not illustrated) other than the identification information acquisition unit 11 and the biometric information acquisition unit 12 by data transmission and the like from a smartphone. The combination information can be freely added or removed from the combination information storage unit 13.

The threshold controller 14 (can be regarded as a "controller" in the aspects of the present disclosure) controls the threshold for determination of success or failure in biometric authentication based on the identification information acquired from the terminal 40 by the identification information acquisition unit 11 and the combination information stored in the combination information storage unit 13. Specifically, when the number of successes in biometric authentication for any combination related to the acquired identification information does not exceed the predetermined number, the threshold controller 14 sets a reference threshold (hereinafter, referred to as a "first threshold Th1"). When the number of successes in biometric authentication for any combination related to the acquired identification information exceeds the predetermined number, the threshold controller 14 sets a controlled threshold (hereinafter, referred to as a "second threshold Th2"). The second threshold Th2 is set to be higher than the first threshold Th1 in order to reduce successes in biometric authentication. The threshold set by the threshold controller 14 is notified to the authentication processing unit 15a of the processing unit 15.

The method of setting the threshold will be specifically described using the combination information illustrated in FIG. 2. The threshold controller 14 is assumed to define the predetermined number as "10". The number of successes or the first threshold Th1 and the second threshold Th2 can be set to have any value according to security performance and the like requested for the authentication device 10.

For example, when the identification information acquired from the terminal 40 by the identification information acquisition unit 11 is "K2", the number of successes in biometric authentication for a sole combination [K2, B] related to the identification information "K2" registered in the combination information in the combination information storage unit 13 is "8". Thus, since the number of successes in biometric authentication for the combination related to the identification information "K2" is less than or equal to the predetermined number, the threshold controller 14 sets the first threshold Th1 as a threshold used in biometric authentication in the authentication processing unit 15a described below. Setting the first threshold Th1 can decrease the false rejection rate for not authenticating the registered user as a valid person but increases the false acceptance rate for erroneously authenticating a different person in the authentication process of the authentication processing unit 15a.

For example, when the identification information acquired from the terminal 40 by the identification information acquisition unit 11 is "K1", the maximum value of the number of successes in biometric authentication for all combinations [K1, A], [K1, C], [K1, D] related to the identification information "K1" registered in the combination information in the combination information storage unit 13 is "17". Thus, since the number of successes in biometric authentication for the combinations related to the identification information "K1" is greater than or equal to the predetermined number, the threshold controller 14 sets the second threshold Th2 as a threshold used in biometric authentication in the authentication processing unit 15a described below. Compared to the setting of the first threshold Th1, setting the second threshold Th2 increases the false rejection rate for not authenticating the registered user as a valid person but decreases the false acceptance rate for erroneously authenticating a different person in the authentication process of the authentication processing unit 15a.

The authentication processing unit 15a of the processing unit 15 determines whether or not the combination of the biometric information on the authentication target user 30 acquired by the biometric information acquisition unit 12 and the identification information on the terminal 40 acquired by the identification information acquisition unit 11 is registered in the combination information stored in the combination information storage unit 13. When the authentication processing unit 15a determines that the combination is not registered in the combination information, the authentication processing unit 15a compares the biometric information on the authentication target user 30 with the biometric information on the registered user registered in the combination information, and authenticates the authentication target user 30 based on the similarity between both biometric information and the threshold that is a reference for authenticating the validity of the user. More specifically, when the similarity between both biometric information is higher than or equal to the threshold (the first threshold Th1 or the second threshold Th2) set by the threshold controller 14, the authentication processing unit 15a determines that the biometric authentication of the authentication target user 30 succeeds.

When the biometric authentication of the authentication target user 30 succeeds in the authentication processing unit 15a, the update processing unit 15b of the processing unit 15 updates the number of successes recorded in the combination information storage unit 13 for the successfully authenticated combination of the identification information and the biometric information, that is, the combination of the identification information acquired by the identification information acquisition unit 11 and the biometric information acquired by the biometric information acquisition unit 12. For example, the update is performed by increasing the number of successes by one (increasing the count value of the counter by one). The number of successes may be the number of consecutive successes in biometric authentication in the authentication processing unit 15a.

In such a case, when the biometric information combined with the identification information in the current authentication process is different from the biometric information that has been combined with the same identification information up to the present, the update processing unit 15b may reset the number of successes to "0" for other combinations related to the same identification information other than the current successfully authenticated combination.

For example, in the state of the combination information illustrated in FIG. 2, when biometric authentication based on the combination [K1, A] that is the same as that up to the present with respect to the identification information "K1" succeeds, the number of successes for the combination [K1, A] is updated to "18" from "17". Meanwhile, in the same state, when biometric authentication based on the combination [K1, C] that is different from that up to the present with respect to the identification information "K1" succeeds, the number of successes for the combination [K1, C] is updated to "1" from "0", and the number of successes for each of the other combinations [K1, A], [K1, D] related to the identification information "K1" is reset to "0". By performing such a reset process, the number of consecutive successes in biometric authentication for the same combination can be easily represented by the number of successes.

Hereinafter, specific examples focused on the combinations for the identification information "K1", "K2" will be described. The initial number of successes for all combinations is assumed to be "0".

First: Authentication succeeds with identification information "K1" & biometric information "A"
→Update number of successes for combination [K1, A] to "1"
Number of successes for combination [K1, C] is "0"
Number of successes for combination [K1, C] is "0"
Number of successes for combination [K2, B] is "0"
Second: Authentication succeeds with identification information "K2" & biometric information "B"
Number of successes for combination [K1, A] is "1"
Number of successes for combination [K1, C] is "0"
Number of successes for combination [K1, C] is "0"
→Update number of successes for combination [K2, B] to "1"
Third: Authentication succeeds with identification information "K1" & biometric information "A"
→Update number of successes for combination [K1, A] to "2"
Number of successes for combination [K1, C] is "0"
Number of successes for combination [K1, D] is "0"
Number of successes for combination [K2, B] is "1"

Fourth: Authentication succeeds with identification information "K1" & biometric information "C"
Reset number of successes for combination [K1, A] to "0"
Update number of successes for combination [K1, C] to "1"
Number of successes for combination [K1, D] is "0"
Number of successes for combination [K2, B] is "1"
Fifth: Authentication succeeds with identification information "K1" & biometric information "A"
→Update number of successes for combination [K1, A] to "1"
→Reset number of successes for combination [K1, C] to "0"
Number of successes for combination [K1, D] is "0"
Number of successes for combination [K2, B] is "1"
Sixth: Authentication succeeds with identification information "K2" & biometric information "B"
Number of successes for combination [K1, A] is "1"
Number of successes for combination [K1, C] is "0"
Number of successes for combination [K1, D] is "0"
→Update number of successes for combination [K2, B] to "2"
Seventh: Authentication succeeds with identification information "K1" & biometric information "A"
→Update number of successes for combination [K1, A] to "2"
Number of successes for combination [K1, C] is "0"
Number of successes for combination [K1, D] is "0"
Number of successes for combination [K2, B] is "2"
X-th: Authentication succeeds with identification information "K1" & biometric information "A"
→Update number of successes for combination [K1, A] to "N"
Number of successes for combination [K1, C] is "0"
Number of successes for combination [K1, D] is "0"
Number of successes for combination [K2, B] is "2"

All or a part of the identification information acquisition unit 11, the biometric information acquisition unit 12, the combination information storage unit 13, the threshold controller 14, and the processing unit 15 can be typically configured as an electronic control unit (ECU) that includes a central processing unit (CPU), a memory, input and output interfaces, and the like. The electronic control unit can implement the function described above by the CPU reading and executing a predetermined program stored in the memory.

Control Performed by Authentication Device

FIG. 3 is a flowchart for describing a procedure of authentication process executed by the authentication device 10 according to the embodiment of the present disclosure. For example, the authentication process is started by establishing communication between the authentication device 10 and the terminal 40 present around the authentication device.

Step S301: The identification information acquisition unit 11 acquires identification information "X" transmitted from the terminal 40. When the identification information "X" is acquired, the process proceeds to step S302.

Step S302: The threshold controller 14 determines whether or not the identification information "X" is registered in the combination information stored in the combination information storage unit 13. When the identification information "X" is registered in the combination information (Yes in S302), the process proceeds to step S303. When the identification information "X" is not registered in the combination information (No in S302), the authentication device 10 determines that the user carrying the terminal having the identification information "X" is not a target for the authentication process, and the present authentication process is finished.

Step S303: The threshold controller 14 determines whether or not a combination for which the number of successes in biometric authentication exceeds the predetermined number is present among combinations [X, #] of the identification information "X" and biometric information "#" (# is any biometric information) registered in the combination information. When a combination for which the number of successes exceeds the predetermined number is present (Yes in S303), the process proceeds to step S305. When a combination for which the number of successes exceeds the predetermined number is not present (No in S303), the process proceeds to step S304.

Step S304: The threshold controller 14 sets the first threshold Th1 as a threshold for determination of success or failure in biometric authentication. When the first threshold Th1 is set, the process proceeds to step S306.

Step S305: The threshold controller 14 sets the second threshold Th2 (>Th1) as a threshold for determination of success or failure in biometric authentication. When the second threshold Th2 is set, the process proceeds to step S306.

Step S306: The biometric information acquisition unit 12 acquires biometric information "Y" from the authentication target user 30. When the biometric information "Y" is acquired, the process proceeds to step S307.

Step S307: The authentication processing unit 15a determines whether or not a combination [X, Y] of the identification information "X" acquired in step S301 and the biometric information "Y" acquired in step S306 is registered in the combination information stored in the combination information storage unit 13. When the combination [X, Y] is registered in the combination information (Yes in S307), the process proceeds to step S308. When the combination [X, Y] is not registered in the combination information (No in S307), the authentication device 10 determines that the user having the biometric information "Y" is not a target for the authentication process, and the present authentication process is finished.

Step S308: The authentication processing unit 15a compares the biometric information "Y" with the biometric information on the registered user registered in the combination information, and determines success or failure in the authentication of the biometric information "Y". When the authentication of the biometric information "Y" succeeds (Yes in S308), the process proceeds to step S309. When the authentication of the biometric information "Y" fails (No in S308), the present authentication process is finished.

Step S309: The update processing unit 15b determines whether or not the combination [X, Y] in the current successful biometric authentication is the combination that has been successfully authenticated consecutively up to the present in the process.

When the combination [X, Y] is the combination that has been successfully authenticated consecutively (Yes in S309), the process proceeds to step S311. When the combination [X, Y] is not the combination that has been successfully authenticated consecutively (No in S309), the process proceeds to step S310.

Step S310: The update processing unit 15b resets the number of successes to "0" for combinations [X, *] of the identification information "X" and any biometric information "*" (≠Y)" other than the combination [X, Y] in the current successful biometric authentication. When the number of successes for other combinations [X, *] is reset, the process proceeds to step S311.

Step S311: The update processing unit 15b updates the number of successes for the combination [X, Y] in the current successful biometric authentication. For example, the number of successes for the combination [X, Y] is increased by one. When the number of successes for the combination [X, Y] is updated, the present authentication process is finished.

Effect of Present Embodiment

As described thus far, in the authentication device 10 according to the embodiment of the present disclosure, the combination information in which the biometric information on the registered user is combined with the identification information on the terminal carried by the registered user is stored in advance in the combination information storage unit 13. The number of successes in biometric authentication is recorded per combination in the combination information. The number of successes is recorded such that as biometric authentication based on a certain combination consecutively succeeds, the number of successes for the combination is increased.

In the authentication device 10 according to the present embodiment, when the authentication target user 30 is authenticated by acquiring the biometric information using the biometric information acquisition unit 12, the threshold (Th1, Th2) for determining success or failure in authentication is controlled based on the identification information "X" of the terminal 40 acquired by the identification information acquisition unit 11. More specifically, when the number of successes for any combination among the combinations [X, #] of the identification information "X" and any biometric information "#" stored in the combination information storage unit 13 exceeds the predetermined number, the threshold for determining success or failure in authentication is set to be higher than that when the number of successes for any combination among the combinations [X, #] related to the identification information "X" does not exceed the predetermined number.

By such a control, the threshold for determining success or failure in authentication can be increased when the user carrying the specific terminal 40 can be inferred with high reliability according to whether or not the number of successes in biometric authentication exceeds the predetermined number in a state where the specific terminal 40 is recognized by acquiring the identification information using the identification information acquisition unit 11. Accordingly, for example, the false acceptance rate for erroneously authenticating a person other than the registered user can be decreased in a situation where the probability of authenticating the user as a valid person is sufficiently high. Accordingly, for example, the anti-theft performance of a device or a vehicle in which the authentication device 10 is installed can be improved.

Modification Example

In the embodiment, when the combination of certain identification information and biometric information that has been successfully authenticated most recently is different from the combination of the identification information and biometric information that has been successfully authenticated consecutively up to the present, the number of successes for combinations other than the most recent successfully authenticated combination of the identification information and the biometric information may be reset to "0". However, in such a case, the number of successes for a combination that is successfully authenticated in a predetermined period may be cumulatively updated instead of resetting the number of successes for the combinations. Such a control can be implemented by removing the processes of steps S309, S310 in the flowchart illustrated in FIG. 3.

By such a control, for example, in a case where two users alternately use one terminal, the false acceptance rate for erroneously authenticating a person other than the two users can be decreased when the number of successes in biometric authentication in the authentication device 10 for each user reaches the predetermined number.

Reference Example

While an example in which the number of successes in biometric authentication stored in the combination information storage unit 13 is increased (counted up) by one from "0" as an initial value at each successful authentication is described in the embodiment, the number of successes may be decreased (counted down) by one from any numerical value as an initial value at each successful authentication. In such a case, the threshold controller 14 may set the first threshold Th1 when the number of successes in biometric authentication is not below the predetermined number, and set the second threshold Th2 when the number of successes in biometric authentication is below the predetermined number.

The present disclosure can be used for an authentication device that authenticates a user using biometric information. The present disclosure is particularly useful when it is desired to decrease the false acceptance rate for erroneously authenticating a person other than a preregistered user.

What is claimed is:

1. An authentication device comprising:
 a memory configured to store combination information including:
  (i) a plurality of combinations of biometric information identifying one or more registered users, and identification information identifying one or more terminals carried by the one or more registered users, and
  (ii) a number of successes in user authentication for each combination; and
 a processor programmed to:
  acquire biometric information and identification information on each of the users;
  authenticate the user based on (i) a result of a comparison between the combination information and the acquired biometric information and identification information of the users and (ii) a threshold for determination of success or failure in user authentication of the user; and
  in response to a condition being satisfied that a number of successful authentications of the user exceeds a predetermined number, set the threshold such that a false acceptance rate for erroneously authenticating a person other than the user is lower than when the condition is not satisfied.

2. The authentication device according to claim 1, wherein
 the processer is programmed to authenticate the user in response to determining that a first combination of the acquired biometric information and a first identification information identify a first terminal is present in the combination information.

3. The authentication device according to claim 2, wherein
the processor is further programmed to, in response to a current authentication of the user based on the first combination being successful, increase the number of successes in user authentication for the first combination stored in the memory.

4. The authentication device according to claim 2, wherein
the threshold is set such that the false acceptance rate is lower than when the first combination is not present.

5. The authentication device according to claim 2, wherein
the number of successes in user authentication of the first combination is a number of consecutive successes in authentication of the first combination.

6. The authentication device according to claim 2, wherein
the processor is further programmed to, in response to a current authentication of the user based on the first combination being successful, reset the number of successes in user authentication for at least one second combination of the first identification information and second biological information, different than the acquired biological information, stored in the memory.

7. The authentication device according to claim 2, wherein
the number of successes in user authentication of the first combination is a number of consecutive successes in authentication of the first combination in a predetermined period of time.

8. The authentication device according to claim 2, wherein
the processor is programmed to
set the threshold to be a first threshold when the number of successes in user authentication for the first combination is greater than or equal to the predetermined number, and
set the threshold to be a second threshold when the number of successes in user authentication for the first combination is less than the predetermined number, the second threshold being lower than the first threshold.

9. The authentication device according to claim 1, wherein the processor is configured by an electronic control unit.

10. A method comprising:
storing combination information including:
(i) a plurality of combinations of biometric information identifying one or more registered users, and identification information identifying one or more terminals carried by the one or more registered users, and
(ii) a number of successes in user authentication for each combination;
acquiring biometric information and identification information on each of the users;
authenticating the user based on (i) a result of a comparison between the combination information and the acquired biometric information and identification information of the users and (ii) a threshold used for determination of success or failure in user authentication of the user; and
in response to a condition being satisfied that a number of successful authentications of the user exceeds a predetermined number, setting the threshold such that a false acceptance rate for erroneously authenticating a person other than the user is lower than when the condition is not satisfied.

11. A non-transitory computer readable medium storing thereon a program causing a computer to execute a process, the process comprising
storing combination information including:
(i) a plurality of combinations of biometric information identifying one or more registered users, and identification information identifying one or more terminals carried by the one or more registered users, and
(ii) a number of successes in user authentication for each combination;
acquiring biometric information and identification information on each of the users;
authenticating the user based on (i) a result of a comparison between the combination information and the acquired biometric information and identification information of the users and (ii) a threshold used for determination of success or failure in user authentication of the user; and
in response to a condition being satisfied that a number of successful authentications of the user exceeds a predetermined number, setting the threshold such that a false acceptance rate for erroneously authenticating a person other than the user is lower than when the condition is not satisfied.

* * * * *